United States Patent [19]

Tanaka et al.

[11] Patent Number: 5,246,488
[45] Date of Patent: Sep. 21, 1993

[54] TEMPORARY RUST RESISTING COATING COMPOSITION

[75] Inventors: Masatoshi Tanaka; Hideo Fukuda, both of Hyogo; Koji Mizohata, Osaka, all of Japan

[73] Assignee: Nippon Paint Co., Ltd., Osaka, Japan

[21] Appl. No.: 946,163

[22] Filed: Sep. 17, 1992

Related U.S. Application Data

[63] Continuation-in-part of Ser. No. 653,156, Feb. 11, 1991, abandoned, which is a continuation of Ser. No. 331,380, Mar. 31, 1989, abandoned.

[30] Foreign Application Priority Data

Mar. 31, 1988 [JP] Japan .................................. 63-79232

[51] Int. Cl.$^5$ ............................................... C04B 35/14
[52] U.S. Cl. ............................... 106/14.44; 106/1.17; 106/14.28; 106/287.14; 106/287.16; 501/141; 501/154
[58] Field of Search ................. 106/1.17, 14.44, 14.28, 106/287.16, 287.14; 501/141, 154

[56] References Cited

U.S. PATENT DOCUMENTS

| | | | |
|---|---|---|---|
| 3,576,652 | 4/1971 | Teicher et al. | 106/38.35 |
| 3,849,141 | 11/1974 | Palm et al. | 106/1.17 |
| 3,910,797 | 10/1975 | Beers | 106/1.17 |
| 3,961,968 | 6/1978 | Wales | 106/287.34 |
| 3,969,127 | 7/1976 | Robitaille et al. | 106/425 |
| 4,254,009 | 3/1981 | Dittrich et al. | 106/1.17 |
| 4,368,235 | 1/1983 | Vaughn, Jr. | 106/287.14 |
| 4,439,239 | 3/1984 | Greigger et al. | 106/287.16 |
| 4,810,293 | 3/1983 | Sano | 106/14.21 |
| 5,035,745 | 7/1991 | Lin et al. | 106/287.16 |
| 5,164,003 | 11/1992 | Bosco et al. | 106/287.14 |
| 5,167,701 | 12/1992 | Savin | 106/14.44 |

FOREIGN PATENT DOCUMENTS 10141381 5/1985 European Pat. Off. .
A30196835 10/1986 European Pat. Off. .

*Primary Examiner*—David Brunsman
*Attorney, Agent, or Firm*—Wenderoth, Lind & Ponack

[57] ABSTRACT

The present invention provides a temporary rust resisting coating composition which has excellent rust resistance after heating even at more than 600° C. and which has good weldability. The temporary rust resisting coating composition of the present invention comprises (A) 10 to 25% by weight of a binder having an ignition loss of not more than 33% by weight,
(B) 40 to 70% by weight of zinc powder,
(C) 5 to 50% by weight of an inorganic oxide pigment which has been heated at not less than 500° C. up to an ignition loss of 3% by weight;

the amounts of the components (A), (B) and (C) being based on a dried film.

8 Claims, No Drawings

TEMPORARY RUST RESISTING COATING COMPOSITION

This application is a continuation-in-part of Ser. No. 07/653,156, filed Feb. 11, 1992, which in turn is a continuation of Ser. No. 07/331,380, filed Mar. 31, 1989, both of the latter applications being now abandoned.

FIELD OF THE INVENTION

The present invention relates to a temporary rust resisting coating composition which has excellent good heat resistance and weldability.

BACKGROUND OF THE INVENTION

There are known many anti corrosive paints containing rust resisting pigments. Among them, zinc rich paint which contains a large amount of zinc powder and a binder is widely used for temporary rust resisting paint of large steel structures, such as ships, bridges and the like, because of its excellent rust resistance. It is believed that the rust resistance of the zinc rich paint is brought about from the sacrificial corrosion of zinc powder caused by an electro-chemical reaction with steel, and from the shut-off of water and oxygen due to the corrosion product of zinc powder.

However, a zinc rich paint has some defects. Although, increased amounts of zinc powder increase the sacrificial corrosion so as to enhance rust resistance, it also increases the white rust of such zinc powder so as to reduce the adhesion properties when an over-coating composition is coated thereon. If the amount of zinc powder is lowered, the (A) 10 to 25% by weight of a organic solvent type binder having an ignition loss of not more than 33% by weight,
(B) 40 to 70% by weight of zinc powder,
(C) 5 to 50% by weight of an inorganic oxide pigment which has been heated at not less than 500° C. up to an ignition loss of 3% by weight;

the amounts of the components (A), (B) and (C) being based on the dried film.

DETAILED DESCRIPTION OF THE INVENTION

The binder (A) is any binder known to the art which has an ignition loss of not more than 33% by weight, preferably 30 to 20% by weight. Examples of the binders are a hydrolyzate of tetra- and/or alkyltri-alkoxysilane, especially a hydrolyzate of the compound of the formula

$$(R_1)_m Si(OR_2)_{4-m}$$

[$R_1$ and $R_2$, which are the same or different, also an alkyl group having 1 to 5 carbon atoms, m is 0 or 1.] such as tetramethoxysilane, tetraethoxysilane, tetrapropoxysilane, methyltrimethoxysilane, methyltriethoxysilane, methyltripropoxysilane, ethyltrimethoxysilane, ethyltriethoxysilane and a mixture thereof; organic solvent type colloidal silica; water-dispersible colloidal silica; alkali silicate; and a mixture thereof. Preferred binders for improving weldability in addition to heat resistance is a mixture of tetra- and/or alkyltri-alkoxysilane and solvent type colloidal silica in a weight sacrificial corrosion becomes insufficient. Also, at a portion where is heated to an elevated temperature, such as the opposite surface of welding or smoothing, the components in the coating volatilize or decompose by heat, so that the cracking of the coating occurs. Thus, the rust resistance declines. Accordingly, although large steel structures are coated by temporary rust resisting paint, the surface preparation before over-coating is essential because they are welded or smoothed in many portions.

A coating composition which contains zinc powder in a small amount and exhibits excellent rust resistance even in the portions heated at an elevated temperature is therefore desired.

In order to develop such a coating composition, many techniques have been proposed, one of which is to enhance heat resistance of a binder (Japanese Patent Application Ser. Nos. 158785/1983 and 93940/1984) and the other is to enhance the rust resistance to heat of the zinc powder (Japanese Patent Application Ser. Nos. 199205/1984 and 281719/1985). These techniques are quite satisfactory, but in some heating conditions, they do not have good properties.

SUMMARY OF THE INVENTION

The present invention provides a temporary rust resisting coating composition which has excellent rust resistance after heating even at more than 600° C. and which has good weldability. The temporary rust resisting coating composition of the present invention comprises ratio (alkoxysilane/colloidal silica) of 85/15 to 30/70 based on $SiO_2$. The hydrolyzate is prepared by controlling the molar ratio of water/$OR_2$ to between 0.45 to 0.55 and wherein the amount of water of said coating composition is controlled to not more than 1% by weight. When the molar ratio of water/$OR_2$ is less than 0.45, its ignition loss becomes too high. On the other hand, when the molar ratio is more than 0.55, the binder (A) will be gelled or the coating composition would contain too much water. Japanese Kokai Publication (unexamined) 93540/1984 discloses a mixture of tetraalkoxysilane and a solvent type colloidal silica, and a mixture of tetraalkoxysilane, alkyltrialkoxysilane and solvent type colloidal silica. The binder (A) is generally present in the coating composition of the present invention in an amount of 10 to 25% by weight, preferably 10 to 20% by weight based on the weight of the dried film. Amounts of less than 10% by weight deteriorate the film properties, thus resulting in a decline of the heat resistance and rust resistance. If the binder is contained in amounts more than 25% by weight, when the polymerization is proceeded at an elevated temperature, much gas is produced which often destroys the cured film.

Any zinc powder can be used for the coating composition of the present invention. Preferably, zinc powder may have a particle size of 1 to 20 micrometers, preferably 3 to 10 micrometer. It can be alloy of zinc and other metals, such as iron, calcium, sodium, potassium and aluminum. An amount of zinc powder can be 40 to 70% by weight, preferably 40 to 60% by weight based on the dried film. Amounts of less than 40% by weight reduce the rust resistance. Amounts of more than 70% by weight increase the white rust to result in a lowering of the adhesion properties to an overcoat coated thereupon. Also, larger amounts of zinc powder adversely affect the weldability in high speed welding.

The inorganic oxide pigment of the present invention is required to be heated at temperatures not less than 500° C. and continued up to an ignition loss of 3% by weight, preferably up to 1% by weight. Heating can be carried out in the air by using an electric furnace, because the pigment inherently is stable even in the air. The pigment can be either natural products or synthetic products, but preferably natural products in view of economical reasons, such as clay, talc, mica and the like. Preferred is clay, because the obtained film has good and rust resistance. A particle size of the pigment is not limited, but preferably not more than 20 micrometer for smooth surface. Grinding of the pigment can be carried out before or after the heating treatment. If the grinding is carried out after heating, dry grinding is preferred.

The coating composition of the present invention may contain other pigments, solvents and additives, in addition to the above mentioned components, if necessary. Typical examples of the other pigments are corrosion preventive pigments, color pigments or metal powder pigments, such as zinc oxide, titanium white, iron oxide, ultramarine blue, chromium green, zinc phosphate, aluminum phosphate, barium metaborate, zinc molybdate, calcium silicate, ferroalloy and the like. Typical examples of the solvents are isopropyl alcohol, n-butyl alcohol, isobutyl alcohol, ethyleneglycol monobutyl ether, ethyleneglycol monoethyl ether, xylene, toluene and the like. An amount of the solvent can be varied in view of coating workability and drying process. Typical examples of the additives are an anti-sagging agent, a wetting agent, a reaction promoter, an antiflooding agent, an adhesion promoting agent, an anti-setting agent and the like.

The coating composition of the present invention can be prepared by an art-known method. The composition can generally be divided into two-packages, one of which contains powder components and the other contains solid components. It is also divided into a package containing components which react with a binder, and the other package containing a binder and the other components which do not react with the binder. That can be manufactured by using a disper, a homogenizer, a roll mill, a sand mill, a ball mill and the like. Just before applying, both packages are mixed sufficiently. The coating composition can apply spray coating, roll coating, brushing and the like. A substrate to be coated can be anything made from steel, especially steel structures. The coating composition is dried by air or hot air.

It is desired that the temporary rust resisting coating composition has a heat resistance of more than 800° C., preferably of more than 500° C. The heat resistance can be achieved through many means, such as by the choice of binders, the choice of additives and the like. The heat loss of the dried coating is not more than 8%, preferably not more than 5%.

The coating composition of the present invention has excellent rust resistance, even on an opposite side of a portion where welding or smoothing is conducted. A surface which is coated with the coating composition of the present invention can be welded without defects by a high speed (80–100 cm/min) welding, such as a gas shielded metal arc welding.

EXAMPLES

The present invention is illustrated by the following Examples which are not to be construed as limiting the invention. In the Examples, all % are based on weight, unless otherwise specified.

Preparation of Binder A

Binder A, a hydrolyzate of tetraalkoxysilane, was prepared by the following components.

| Ingredients | Parts by weight |
| --- | --- |
| Tetraethoxysilane (Ethylsilicate 28 available from Nippon Colcoat Co, Ltd.) | 100 |
| Isobutyl alcohol | 50 |
| Isopropyl alcohol | 24.7 |
| Water | 16.6 |
| 0.1 N Hydrochloric acid | 0.7 |

The above ingredients were mixed to obtain Binder A having a heat residue of 23% by weight (110° C. for 3 hours) and an ignition residue of 15% by weight (800° C. for one hour). It also had an ignition loss of 35% by weight based on the dried film.

Preparation of Binder B

Binder B, a hydrolyzate of a mixture of tetraalkoxysilane and alkyltrialkoxysilane, was prepared by the following components.

| Ingredients | Parts by weight |
| --- | --- |
| Tetraethoxysilane (Ethylsilicate 28 available from Nippon Colcoat Co, Ltd.) | 208.3 |
| Methyltriethoxysilane | 106.4 |
| Isobutyl alcohol | 130 |
| Isopropyl alcohol | 169.9 |
| Water | 49.9 |
| 0.1 N Hydrochloric acid | 2.2 |

The above ingredients were mixed to obtain Binder B having a heat residue of 25% by weight (110° C. for 3 hours) and an ignition residue of 17% by weight (800° C. for one hour). It also had an ignition loss of 32% by weight based on the dried film.

Preparation of Binder C

Organic solvent type colloidal silica sol (50% dilute solution of methanol silicasol (Nissan Chemical Industries, Ltd.) with isopropyl alcohol) was used as Binder C. Binder C had a heat residue of 16% by weight (110° C. for 3 hours) and an ignition residue of 15% by weight (800° C. for one hour). It also had an ignition loss of 6% by weight based on the dried film.

EXAMPLES 1 TO 7 AND COMPARATIVE EXAMPLES 1 TO 3

The components shown in Table 1 were mixed to obtain coating compositions.

TABLE 1

|  | Examples | | | | | | | Comparative Examples | | |
| --- | --- | --- | --- | --- | --- | --- | --- | --- | --- | --- |
|  | 1 | 2 | 3 | 4 | 5 | 6 | 7 | 1 | 2 | 3 |
| Binder A | 25.0 | 25.0 | 40.0 | 20.0 | 25.0 | 20.0 |  | 50.0 | 50.0 | 25.0 |
| Binder B |  |  |  |  |  |  | 25.0 |  |  |  |
| Binder C | 25.0 | 25.0 | 10.0 | 20.0 | 35.0 | 30.0 | 25.0 |  |  | 25.0 |
| Zinc powder | 25.0 | 35.0 | 30.0 | 40.0 | 35.0 | 30.0 | 35.0 | 25.0 | 25.0 | 25.0 |
| Calcined clay | 24.5 | 14.5 | 19.5 | 14.5 | 4.5 |  |  |  | 24.5 |  |

TABLE 1-continued

|  | Examples | | | | | | | Comparative Examples | | |
| --- | --- | --- | --- | --- | --- | --- | --- | --- | --- | --- |
|  | 1 | 2 | 3 | 4 | 5 | 6 | 7 | 1 | 2 | 3 |
| Calcined talc |  |  |  |  |  | 14.5 | 14.5 |  |  |  |
| Zinc molybdated |  |  | 5.0 |  |  |  |  |  |  |  |
| Aluminum phosphate |  |  |  |  |  | 5.0 |  |  |  |  |
| Anti-sagging agent | 0.5 | 0.5 | 0.5 | 0.5 | 0.5 | 0.5 | 0.5 | 0.5 | 0.5 | 0.5 |
| Normal clay |  |  |  |  |  |  |  | 24.5 |  | 24.5 |
| Binder (film) | 16 | 16 | 18 | 12 | 22 | 15 | 17 | 19 | 19 | 16 |
| Zn (film) | 42 | 59 | 49 | 59 | 68 | 50 | 58 | 41 | 41 | 42 |
| Ignited pigment | 41 | 24 | 32 | 21 | 9 | 24 | 24 | 0 | 40 | 0 |
| The others | 1 | 1 | 1 | 8 | 1 | 11 | 1 | 40 | 1 | 42 |
| Ignited loss (binder) | 24 | 24 | 31 | 24 | 22 | 21 | 28 | 35 | 35 | 24 |
| Ignited loss (film) | 4 | 4 | 6 | 3 | 5 | 5 | 5 | 12 | 7 | 10 |
| Eposure test |  |  |  |  |  |  |  |  |  |  |
| Room drying | 9 | 10 | 10 | 10 | 10 | 10 | 9 | 9 | 10 | 10 |
| 600° C. | 8 | 9 | 8 | 9 | 9 | 7 | 8 | 4 | 4 | 5 |
| 800° C. | 7 | 8 | 7 | 8 | 6 | 6 | 7 | 2 | 3 | 2 |
| Welding test |  |  |  |  |  |  |  |  |  |  |
| Appearance defects (%) | 0 | 0 | 0 | 0 | 0 | 0 | 0 | 40 | 15 | 30 |
| Blow holes (grade) | 1 | 1 | 1 | 1 | 1 | 1 | 2 | 4 | 3 | 4 |

(1) Exposure test

The coating composition was applied to a sandblasted steel panel by an air spray coating in a dried film thickness of 15±2 micrometer, and naturally dried at 20° C. and a relative humidity of 75% for 7 days. It was then heated at 600° C. or 800° C. for 10 minutes and cooled. The obtained panel was subjected to a rust resistant test in which the panel was left for 6 months at a sea side (Tamanoshi, Okayama-ken, Japan) and red rust was evaluated according to ASTM D 610.

(2) Weldability test

The coating composition was applied on both sides of to two shotblasted steel panels (12 X 150 X 700 mm) by an air spray coating and naturally dried at room temperature for 7 days. One of the panels (panel A) was coated in a dried film thickness of 15±2 micrometer and the other (panel B) was coated in a dried film thickness of 30±3 micrometer. The panel A was mechanically sheared at its end and connected with the panel B and level-fillet welded by a carbon dioxide gas shielded metal arc welding method at a speed of 90 cm/min, using a welding wire SF-1 (Nittetsu Welding Industries Co. Ltd.). Appearance defects were evaluated by a total length of gas depression. Blow holes were evaluated according to JIS Z 3104.

As is apparent from Table 1, the coating composition has excellent rust resistance after heating at 600° C. or 800° C. It also exhibits good weldability for a high speed welding which is two times more than a conventional welding.

What is claimed is:

1. A temporary rust resisting coating composition having excellent weldability which consists essentially of:

(A) 10 to 25% by weight of a organic solvent dispersed binder having an ignition loss of not more than 33% by weight, (B) 40 to 70% by weight of zinc powder, (C) 5 to 50% by weight of an talc, clay or mica which has been heated at not less than 500° C. up to an ignition loss of 3% by weight;

said binder (A) being a mixture of the solvent type colloidal silica ($a_2$) and a hydrolyzate ($a_1$) of the compound having the formula

$$(R_1)_m Si(OR_2)_{4-m}$$

wherein $R_1$ and $R_2$, which are the same of different, represent an alkyl group having 1 to 5 carbon atoms, m is 0 or 1 in a weight ratio ($a_1/a_2$) of 85/15 to 30/70 based on $SiO_2$, and said hydrolyzate ($a_1$) being prepared by controlling a molar ratio of water/$OR_2$ to from 0.45 to 0.55 and wherein the amounts of the components (A), (B) and (C) are based on a dried film of said coating composition and an amount of water of said coating composition is controlled to not more than 1% by weight.

2. The coating composition according to claim 1 wherein said zinc powder has a particle size of 1 to 20 micrometers.

3. The coating composition according to claim 1 wherein said zinc powder is an alloy of zinc and other metals.

4. The coating composition according to claim 1 wherein said inorganic oxide pigment is clay, talc or mica.

5. The coating composition according to claim 1 wherein said inorganic oxide pigment has a particle size of not more than 20 micrometers.

6. The coating composition according to claim 1 wherein said dried film has an ignition loss, at the deoxygenated condition for 1 hour, of not more than 8%.

7. The coating composition according to claim 1 which exhibits rust resistance and improved weldability at temperatures of 600° C. and above.

8. The coating composition according to claim 7 which exhibits rust resistance and improved weldability at temperatures of 600° C. to 800° C.

* * * * *